(12) United States Patent
O'Hara

(10) Patent No.: US 8,329,356 B2
(45) Date of Patent: Dec. 11, 2012

(54) FUEL CELL MICROPOROUS LAYER INCLUDING PARTICLES WITH A CONTROLLED PORE SIZE DISTRIBUTION

(75) Inventor: Jeanette E. O'Hara, Honeoye, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1014 days.

(21) Appl. No.: 11/470,776

(22) Filed: Sep. 7, 2006

(65) Prior Publication Data
US 2008/0063924 A1    Mar. 13, 2008

(51) Int. Cl.
*H01M 4/86* (2006.01)
*H01M 8/02* (2006.01)
*H01M 8/04* (2006.01)

(52) U.S. Cl. ........ 429/512; 429/483; 429/480; 429/534; 429/414

(58) Field of Classification Search .................. None
See application file for complete search history.

(56) References Cited

U.S. PATENT DOCUMENTS

| 6,803,143 | B2 | 10/2004 | Zuber et al. | |
|---|---|---|---|---|
| 2003/0108785 | A1 | 6/2003 | Wu et al. | |
| 2004/0166400 | A1* | 8/2004 | Gascoyne et al. | 429/44 |
| 2005/0063893 | A1 | 3/2005 | Ayala et al. | |
| 2005/0233203 | A1* | 10/2005 | Hampden-Smith et al. | 429/44 |
| 2006/0099364 | A1 | 5/2006 | Harrison et al. | |
| 2006/0204832 | A1* | 9/2006 | Mei et al. | 429/44 |
| 2007/0048521 | A1* | 3/2007 | Istvan | 428/367 |

FOREIGN PATENT DOCUMENTS

CN    1608331 A    4/2005

OTHER PUBLICATIONS

Arunachala M. Kannan et al, Gas Diffusion Layer Using a New Type of Graphitized Nano-Carbon Pureblack for Proton Exchange Membrane Fuel Cells, Electrochemistry Communications 8 (2006) 887-891.

* cited by examiner

*Primary Examiner* — Keith Walker
(74) *Attorney, Agent, or Firm* — BrooksGroup

(57) ABSTRACT

A fuel cell microporous layer including a plurality of porous particles wherein at least 90% of intruded volume by mercury porosimetry is introduced into pore size diameters ranging from about 0.43 μm to about 0.03 μm.

18 Claims, 3 Drawing Sheets

FUEL CELL MICROPOROUS LAYER INCLUDING PARTICLES WITH A CONTROLLED PORE SIZE DISTRIBUTION

TECHNICAL FIELD

The field to which the disclosure generally relates includes fuel cells, fuel cell components, and methods of making and using the same.

BACKGROUND

The gas diffusion media component of a proton exchange membrane fuel cell, also known as polymer electrolyte membrane fuel cell, is commonly composed of a non-woven carbon fiber paper or a woven carbon cloth. The gas diffusion media component may be treated in order to render the material hydrophobic. Typically, a hydrophobic layer is deposited on one of two faces of the gas diffusion media material. Suitable hydrophobic layers can be formed using hydrophobic polymers such as polyvinylidene fluoride (PVdF), fluoroethylene propylene (FEP), and polytetrafluoroethylene (PTFE). As an alternative to the hydrophobic polymers mentioned, other organic and inorganic hydrophobic materials may also be used. The thickness of the hydrophobic layers is typically 5 to 40 micrometers. In addition, a microporous layer may be applied to the gas diffusion media layer for more effective water management, or to be more specific, to provide a desired mass transport characteristic. Under high current density operations of the fuel cell, the microporous layer must have the ability to move products out of the microporous layer and let reactants reach an underlying catalyst layer.

Recently, carbon corrosion has been identified as part of the voltage degradation that occurs during lifetime operation of polymer electrolyte membrane fuel cells. Carbon corrosion may occur both on the catalyst electrodes and the gas diffusion media layers. The portion of degradation that can be attributed to each component is difficult to separate as they cannot be isolated in situ.

Heretofore, those skilled in the art have used carbon black, graphite, and carbon nanotubes as components in microporous layers. However, each of these materials have different structures, primary particle sizes, primary aggregate sizes, BET surface area, pore size distribution, oil absorption, etc. Further, each of these materials will give different in situ performance when incorporated into a microporous layer. A type of carbon black frequently used in microporous layers is acetylene black, but others commonly used include Vulcan SC-72, Black Pearls 2000, etc.

SUMMARY OF EXEMPLARY EMBODIMENTS OF THE INVENTION

One embodiment of the invention may include a fuel cell comprising a microporous layer comprising particles and wherein the particles are porous. The particles may have a pore size distribution wherein at least 90% of the intruded volume by mercury porosimetry is introduced into pore size diameters ranging from about 0.43 μm to about 0.03 μm. In another embodiment of the invention, at least 70% of intruded volume is introduced into pore size diameters ranging from about 0.18 μm to about 0.04 μm. In another embodiment of the invention, at least 55% of the intruded volume is introduced into pore size diameters ranging from about 0.11 μm to about 0.06 μm. In one embodiment of the invention, the particles comprise graphitized carbon.

Other exemplary embodiments of the present invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

Figure 1:
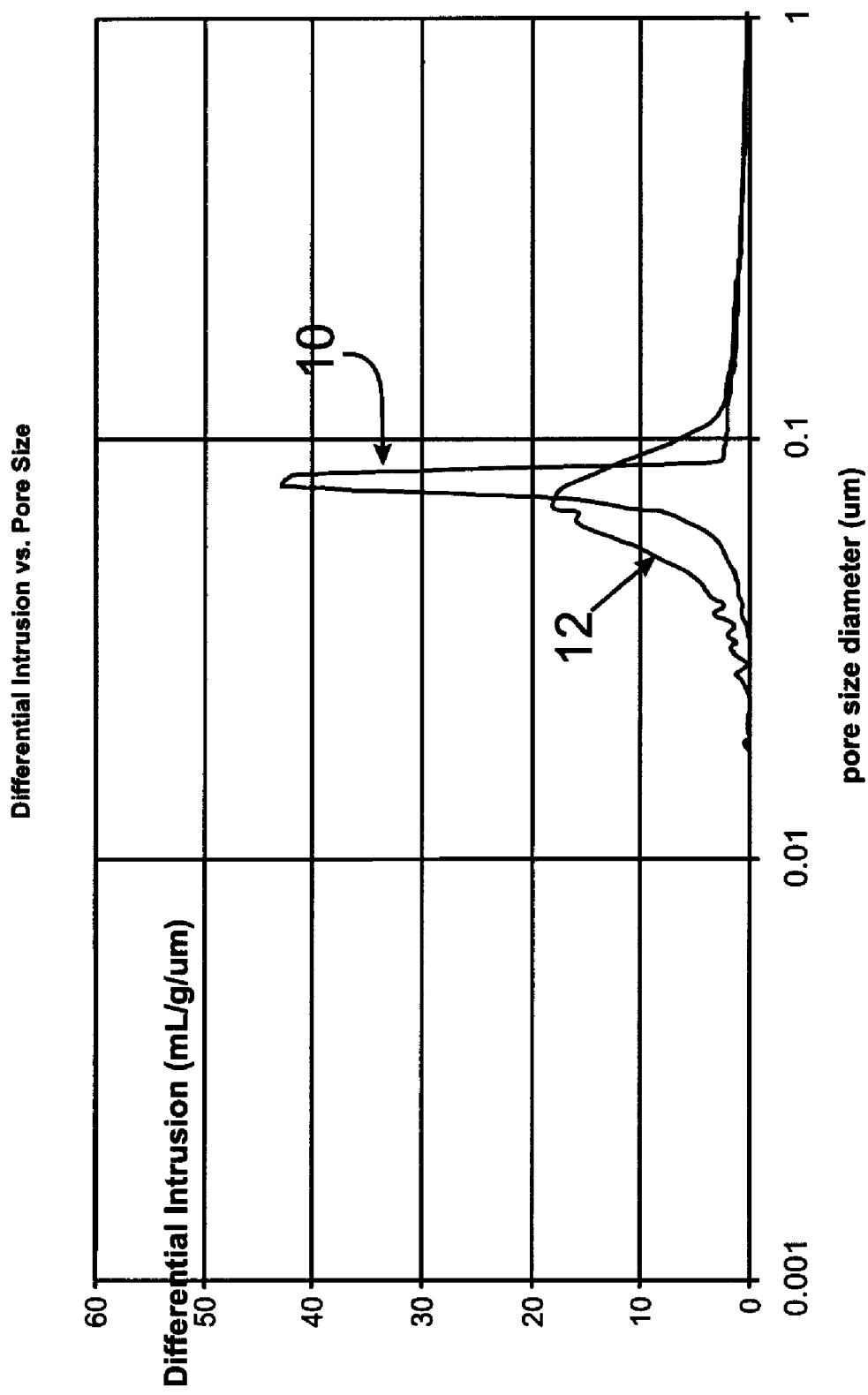
FIG. 1 is a graph of the differential intrusion of acetylene black, and graphitized particles useful according to one embodiment of the invention.

The following description of the embodiment(s) is merely exemplary in nature and is in no way intended to limit the invention, its application, or uses.

One embodiment of the invention includes a product including a microporous layer including particles having a controlled pore size diameter distribution. In one embodiment of the invention, a microporous layer is provided, including a plurality of particles including graphitized carbon and a binder. The particles are porous having a pore size diameter distribution wherein at least 90% of the intruded volume is introduced into pore size diameters ranging from about 0.43 μm to about 0.03 μm as measured using mercury porosimetry. In another embodiment of the invention, at least 70% of intruded volume is introduced into pore size diameters ranging from about 0.18 μm to about 0.04 μm. In another embodiment of the invention, at least 55% of the intruded volume is introduced into pore size diameters ranging from about 0.11 μm to about 0.06 μm. In one embodiment of the invention, the particle may have a primary aggregate size ranging from about 0.04 μm to about 0.12 micrometers. In another embodiment of the invention, the microporous layer including particles having a controlled pore size diameter distribution also includes a binder and is produced so that the microporous layer has an average pore size ranging from about 0.05 μm to about 1 μm.

A microporous layer according to one embodiment of the invention may include a binder that may include a hydrophobic polymer such as, but not limited to, polyvinylidene fluoride (PVdF), fluoroethylene propylene (FEP), polytetrafluoroethylene (PTFE) or other organic or inorganic hydrophobic materials. The particles and binder may be included in a liquid phase which may be, for example, a mixture of an organic solvent and water to provide dispersion. In various embodiments, the solvent may include at least one of 2-propanol, 1-propanol or ethanol, etc. The dispersion may be applied to a fuel cell substrate, such as, a gas diffusion media layer or a hydrophobic coating over the gas diffusion media layer. In another embodiment, the dispersion may be applied to an electrode. The dispersion is dried (by evaporating the solvent) and the resulting dried microporous layer may include 60-90 weight percent particles and 10-40 weight percent binder. In various other embodiments, the binder may range from 10-30 weight percent of the dried microporous layer. A suitable particle for the microporous layer includes a graphitized carbon particle available from Superior Graphite, Chicago, Ill. under the trademark PUREBLACK SCD 205-110.

In one embodiment of the invention, the microporous layer may be deposited to a thickness ranging from about 5 µm to about 30 µm. The microporous layer may have a pore size ranging from about 0.05 µm to about 1 µm, and in one embodiment, the carbon utilized in the layer consists of porous particles where at least 90% of the intruded volume is introduced into pore size diameters ranging from about 0.43 µm to about 0.03 µm.

Referring now to FIG. 1, illustrated by curve 10 is the differential intrusion curve for a graphitized carbon particle (PUREBLACK SCD 205-110) useful in making a microporous layer according to one embodiment of the invention. As will be appreciated from FIG. 1, in this particular embodiment, at least 70% of intruded volume is introduced into pore size diameters of the graphitized carbon ranging from about 0.18 µm to about 0.04 µm. In comparison, curve 12 illustrates the differential intrusion distribution for acetylene black particles. As will be appreciated, the differential intrusion curve for acetylene black illustrated by curve 12 is much wider than that for the graphitized carbon particles illustrated by curve 10.

Figure 2:
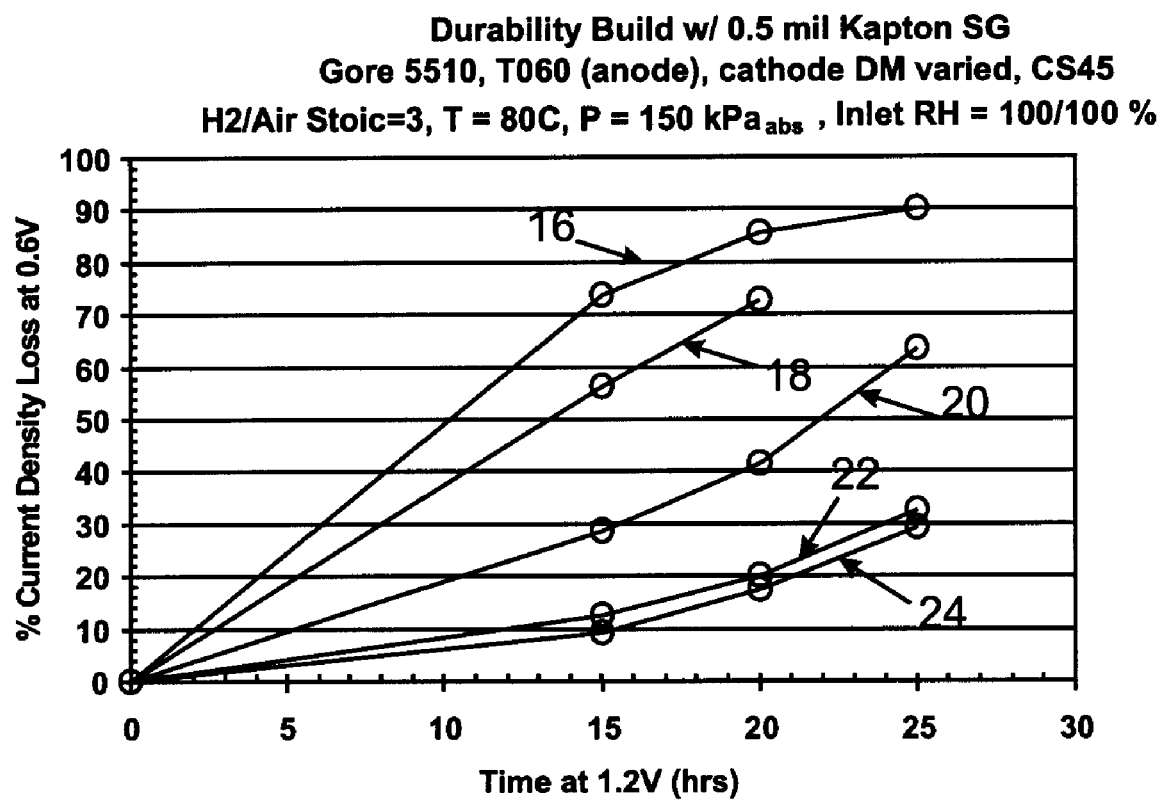
FIG. 2 is a graph illustrating the results of accelerated carbon corrosion test performed with various microporous layers.

Referring now to FIG. 2, accelerated carbon corrosion tests were performed on a variety of fuel cells, including a variety of microporous layers. The accelerated carbon corrosion tests were executed in 50 cm$^2$ cells held at 1.2V for 25 hours and performance curves plotted as shown in FIG. 2. Carbon corrodes at a high potential ($\geq$1.0V) and the presence of water at 50° C. wherein carbon and water produces carbon dioxide and hydrogen protons and electrons. At voltages such as 1.2V, carbon corrodes excessively. During the test, all parameters were kept constant except for the cathode gas diffusion media wherein the impact of using graphitized carbon particles of a controlled pore size diameter distribution were investigated and quantified as a loss of current density at 0.6V as seen in the performance curves from before and after the potential hold. Curve 16 represents the performance of a commercial gas diffusion layer, including a microporous layer. Curve 18 represents the performance of a second commercially available gas diffusion/microporous layer. Curve 20 represents the performance of a microporous layer including acetylene black particles in 25 weight percent polytetrafluoroethylene. Curve 22 represents the performance of a microporous layer including porous graphitized carbon particles in 25 weight percent polytetrafluoroethylene according to one embodiment of the invention. Curve 24 represents the performance of a microporous layer including porous graphitized particles in 25 weight percent polytetrafluoroethylene with a slightly different hydrophobic treatment in the substrate according to another embodiment of the invention. For the microporous layers represented by curves 22 and 24, at least 90% of the intruded volume is introduced into pore size diameters of the graphitized carbon ranging from about 0.43 µm to about 0.03 µm. FIG. 2 shows the improved impact of utilizing graphitized particles having a controlled pore size diameter distribution in limiting current density at 0.6V after 25 hours of potential hold over a variety of other microporous layers utilizing different particles.

The performance of various graphitized carbon, carbon black, and graphite microporous layer samples were investigated under both dry inlet and wet inlet operating conditions. Fuel cells including microporous layers having graphitized carbon particles with controlled pore size diameter distribution according to embodiments of the invention and microporous layers including acetylene black particles performed similarly under both dry and fully humidified conditions. However, other samples reached limited current densities much sooner than microporous layers, including graphitized carbon particles according to embodiments of the invention and microporous layers including acetylene black.

One embodiment of the invention includes mixing 2.4 grams of Superior Graphite PUREBLACK SCD 205-11, 20 mL deionized water, 25 mL isopropyl alcohol, 0.2 grams ammonium carbonate, which was ball milled using 30 milliliters of 3.0 mm zirconia beads for 20 hours at 120 rpm. Thereafter, approximately 1.33 grams T-30 (DuPont) which is 60 wt % PTFE in suspension, was added and the mixture removed from the ball mill and hand-shook for 1 to 2 minutes and coated on a gas diffusion media layer and thereafter sintered at approximately 380° C. for 30 minutes.

Figure 3:
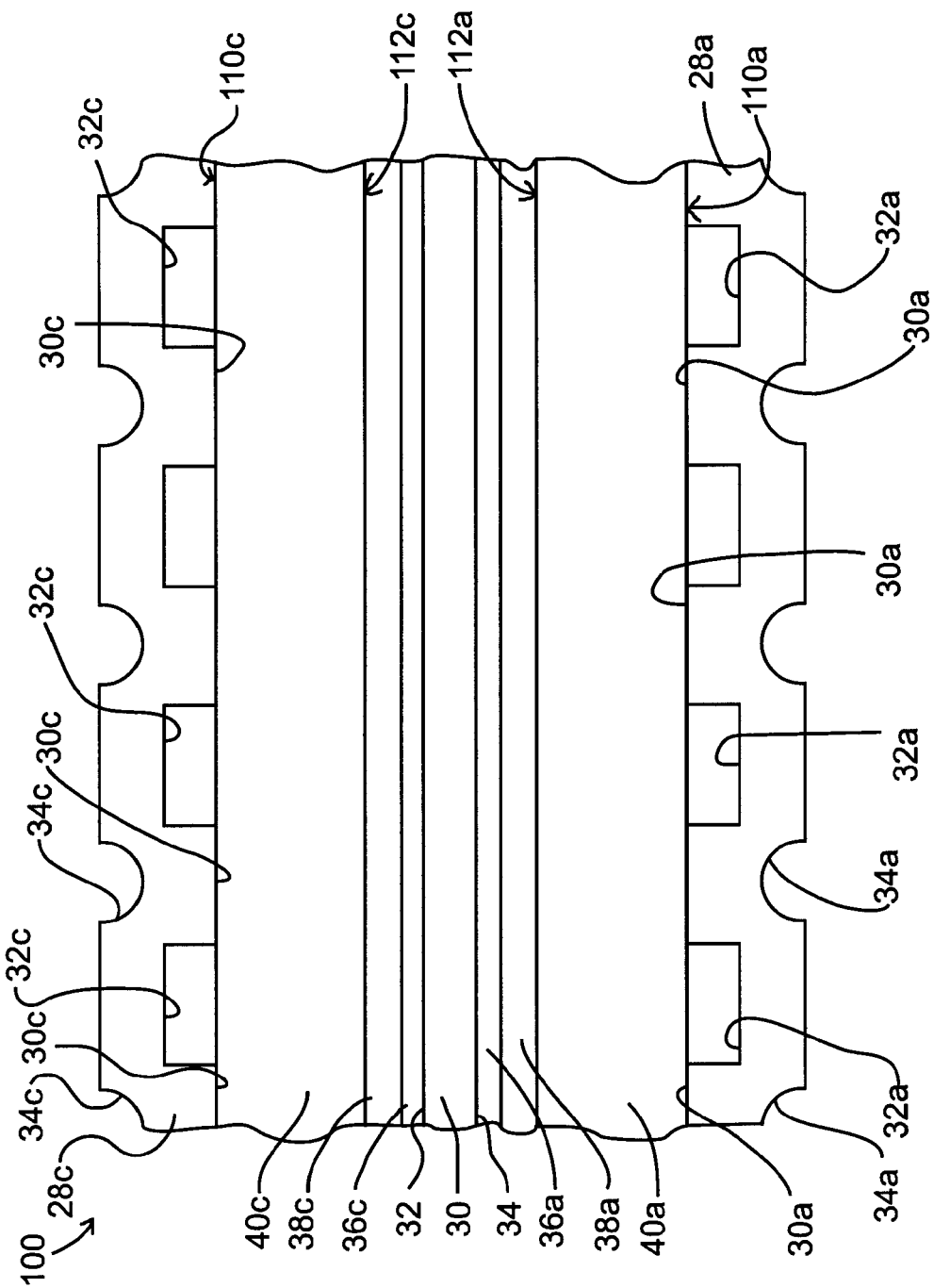
FIG. 3 illustrates a portion of a fuel cell stack including at least one microporous layer according to one embodiment of the invention.

Referring now to FIG. 3, according to one embodiment of the invention, illustrates a portion of a fuel cell stack 100 including a plurality of fuel cells including at least one microporous layer 38a, 38c having particles including a controlled pore size diameter wherein at least 90% of the intruded volume is introduced into pore sizes ranging from about 0.43 µm to about 0.03 µm in diameter.

The fuel cell 100 may include a soft goods portion, also known as a membrane electrode assembly, which may include a polymer electrolyte membrane 30 having a first face 32 and an opposite second face 34. A cathode electrode 36c is provided over the first face 32 of the membrane 30. A first microporous layer 38c according to one embodiment of the invention is provided over the cathode layer 36c. A first gas diffusion media layer 40c may be provided over the first microporous layer 38c, and a first bipolar plate 28c may be provided over the first gas diffusion media layer 40c. The first bipolar plate 28c may include a plurality of lands 30c and channels 32c defined in one face thereof, and a plurality of cooling channels 34c defined in a second face thereof. Optionally, a hydrophobic coating may be deposited on the first face 110c or second face 112c of the first gas diffusion media layer 40c. In such case, the first microporous layer 38c is deposited on the hydrophobic coating on the second face 112c of the first gas diffusion media layer 40c.

Similarly, an anode layer 36a is deposited on the second face 34 of the membrane 30. A second microporous layer 38a is provided underlying the anode layer 36a. A second gas diffusion media layer 40a is provided underlying the second microporous layer 38a. A hydrophobic coating may be deposited on one or both of a first face 110a or second face 112a of the second gas diffusion media layer 40a. A second bipolar plate 28a may underlie the second gas diffusion media layer 40a and may include a plurality of lands 30a and channels 32a formed in one face thereof and a plurality of cooling channels 34a defined in a second face thereof. In one embodiment of the invention, at least one of the first and second microporous layers 38a, 38c include a plurality of particles having a controlled pore size diameter distribution. Preferably, at least the first microporous layer 38c overlying the cathode layer 36c includes graphitized carbon particles having a controlled pore size diameter distribution wherein at least 70% of intruded volume by mercury porosimetry is introduced into pore size diameters ranging from about 0.18 µm to about 0.04 µm, and most preferably at least 55% of the intruded volume is introduced into pore size diameters ranging from about 0.11 µm to about 0.06 µm. These embodiments are particularly helpful in managing the flow of water created at the cathode layer 36c.

The solid polymer electrolyte membrane 30 useful in various embodiments of the invention may be an ion-conductive material. Examples of suitable membranes are disclosed in U.S. Pat. Nos. 4,272,353 and 3,134,689, and in the Journal of Power Sources, Volume 28 (1990), pages 367-387. Such membranes are also known as ion exchange resin membranes. The resins include ionic groups in their polymeric structure; one ionic component for which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cationic exchange, proton conductive resins is the so-called sulfonic acid cationic exchange resin. In the sulfonic acid membranes, the cationic exchange groups are sulfonic acid groups which are attached to the polymer backbone.

The formation of these ion exchange resins into membranes or chutes is well-known to those skilled in the art. The preferred type is perfluorinated sulfonic acid polymer electrolyte in which the entire membrane structure has ionic exchange characteristics. These membranes are commercially available, and a typical example of a commercial sulfonic perfluorocarbon proton conductive membrane is sold by E. I. DuPont D Nemours & Company under the trade designation NAFION. Other such membranes are available from Asahi Glass and Asahi Chemical Company. The use of other types of membranes, such as, but not limited to, perfluorinated cation-exchange membranes, hydrocarbon based cation-exchange membranes as well as anion-exchange membranes are also within the scope of the invention.

In one embodiment, the electrodes 36c, 36a (cathode layer and anode layer) may be catalyst layers which may include a group of finely divided carbon particles supporting finely divided catalyst particles such as platinum, and an ion conductive material such as a proton conducting ionomer, intermingled with the particles. The proton conductive material may be an ionomer such as a perfluorinated sulfonic acid polymer. The catalyst materials may include metals such as platinum, palladium, and mixtures of metals such as platinum and molybdenum, platinum and cobalt, platinum and ruthenium, platinum and nickel, platinum and tin, other platinum transition-metal alloys, and other fuel cell electrocatalysts known in the art.

In one embodiment of the invention, the gas diffusion media layers 40c, 40a may include any electrically conductive porous material. In various embodiments, the gas diffusion media layers 40c, 40a may include non-woven carbon fiber paper or woven carbon cloth which may be treated with a hydrophobic material, such as, but not limited to, polymers of polyvinylidene fluoride, fluroethylene propylene or polytetrafluoroethylene. The gas diffusion media layers 40c, 40a may have an average pore size ranging from 5-40 micrometers.

In one embodiment of the invention, the bipolar plates 28c, 28a may include one or more layers of a metal for electrically conductive composite material. In one embodiment, the bipolar plates 28c, 28a include stainless steel. The lands 30c, 30a, and channels 32c, 32a may be formed in the bipolar plate by machining, etching, stamping, molding or the like.

When the terms "over", "overlying", "overlies", or "under", "underlying", "underlies" are used herein with respect to the relative position of one component or layer with respect to a second component or layer, such shall mean that the first component or layer is in direct contact with the second component or layer, or that additional layers or components may be interposed between the first component or layer and the second component or layer.

The above description of embodiments of the invention is merely exemplary in nature and, thus, variations thereof are not to be regarded as a departure from the spirit and scope of the invention.

What is claimed is:

1. A product comprising:
a fuel cell microporous layer that, in a proton exchange membrane fuel cell, is situated between an electrode layer and a gas diffusion media layer, the fuel cell microporous layer consisting essentially of graphitized carbon particles and a hydrophobic binder, the graphitized carbon particles having pores, the pores of the graphitized carbon particles being defined by a pore size distribution wherein, as defined by mercury porosimetry, at least 90% of an intruded volume is introduced into pores having a pore size diameter ranging from about 0.43 μm to about 0.03 μm and a peak differential intrusion of greater than 40 ml/g/μm;
wherein at least 55% of the intruded volume is introduced into pores having a pore size diameter ranging from about 0.11 μm to about 0.06 μm.

2. A product as set forth in claim 1 wherein the binder comprises at least one of a polymer of polyvinylidene fluoride, fluorotheylene propylene, or polytetrafluoroethylene.

3. A product as set forth in claim 1 wherein the binder is present in 10-40 weight percent of the microporous layer.

4. A product as set forth in claim 3 wherein the graphitized carbon particles are present in 60-90 weight percent of the microporous layer.

5. A product as set forth in claim 1 wherein the microporous layer has a thickness ranging from 5 μm to 30 μm.

6. A product as set forth in claim 1 wherein the microporous layer overlies a cathode catalyst layer which overlies a polymer electrolyte membrane.

7. A product as set forth in claim 1 wherein the microporous layer has an average pore size ranging from about 0.05 μm to about 1 μm.

8. A product as set forth in claim 1 wherein the microporous layer overlies a gas diffusion media layer.

9. A product as set forth in claim 8 wherein the microporous layer overlies a hydrophobic coating on the gas diffusion media layer.

10. A product as set, forth in claim 9 wherein the hydrophobic coating on the gas diffusion media layer comprises at least one of a polymer of polyvinylidene fluoride, fluoroethylene propylene, or polytetrafluoroethylene.

11. A product as set forth in claim 1 wherein the microporous layer is adjacent a cathode layer.

12. A product as set forth in claim 1 wherein the microporous layer is adjacent an anode layer.

13. A product as set forth in claim 1 further comprising a polymer electrolyte membrane having a first face and a second face, a cathode layer over the first face of the membrane, and an anode layer over the second face of the membrane, and further comprising a second microporous layer, and wherein the first microporous layer overlies the cathode layer, and the second microporous layer overlies the anode layer.

14. A product as set forth in claim 1 wherein at least 70% of the intruded volume is introduced into pores having a pore size diameter ranging from about 0.18 μm to about 0.04 μm.

15. A product as set forth in claim 1 wherein the binder comprises at least one of a polymer of polyvinylidene fluoride, fluorotheylene propylene, or polytetrafluoroethylene.

16. A product as set forth in claim 1 wherein the microporous layer overlies a cathode catalyst layer which overlies a polymer electrolyte membrane.

17. A product as set forth in claim 1 wherein the microporous layer overlies a gas diffusion media layer.

18. A product comprising:
a polymer electrolyte membrane;
a cathode layer and an anode layer situated on opposite sides of the polymer electrolyte membrane;
a first gas diffusion media layer situated adjacent to the cathode layer opposite the polymer electrolyte membrane and a second gas diffusion media layer situated adjacent to the anode layer opposite the polymer electrolyte membrane;
a microporous layer situated between either the cathode layer and the first gas diffusion media layer or the anode layer and the second gas diffusion media layer, the microporous layer consisting essentially of a plurality of graphitized carbon particles and a hydrophobic binder, wherein the graphitized carbon particles comprise pores that are defined by a pore size distribution wherein, as defined by mercury porosimetry, at least 90% of an intruded volume is introduced into pores having a pore size diameter ranging from about 0.43 µm to about 0.03 µm and a peak differential intrusion of greater than 40 ml/g/µm, at least 55% of the intruded volume is introduced into pores having a pore size diameter ranging from about 0.11 µm to about 0.06 µm and wherein the binder comprises at least one of a polymer of polyvinylidene fluoride, fluoroethylene propylene or polytetrafluoroethylene.

* * * * *